United States Patent
Liang et al.

(10) Patent No.: US 10,944,109 B2
(45) Date of Patent: Mar. 9, 2021

(54) METHODS OF PRODUCING A LITHIUM CARBON FLUORIDE PRIMARY BATTERY

(71) Applicant: SCHLUMBERGER TECHNOLOGY CORPORATION, Sugar Land, TX (US)

(72) Inventors: Hanpu Liang, Cambridge (GB); Nathan Lawrence, Cambridge (GB); Timothy Jones, Cambridge (GB); Steven Gahlings, Cambridge (GB); Christine Jarvis, Stonehouse (GB); Wen Rong Li, Cambridge (GB); Rogerio Tadeu Ramos, Eastleigh (GB); Vladimir Hernandez Solis, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/408,503

(22) Filed: May 10, 2019

(65) Prior Publication Data

US 2019/0267626 A1    Aug. 29, 2019

Related U.S. Application Data

(62) Division of application No. 14/935,043, filed on Nov. 6, 2015, now abandoned.

(30) Foreign Application Priority Data

Nov. 6, 2014    (GB) ...................................... 1419745

(51) Int. Cl.
*H01M 4/58*    (2010.01)
*H01M 4/583*    (2010.01)
(Continued)

(52) U.S. Cl.
CPC ............ *H01M 4/5835* (2013.01); *C01B 32/10* (2017.08); *H01M 4/08* (2013.01); *H01M 4/382* (2013.01);
(Continued)

(58) Field of Classification Search
CPC ............................ H01M 4/5835; C01B 32/10
(Continued)

(56) References Cited

U.S. PATENT DOCUMENTS 3,536,532 A    10/1970    Wanatabe
3,700,502 A    10/1972    Wanatabe
(Continued)

FOREIGN PATENT DOCUMENTS

EP    1551069 A1    7/2005
EP    2747177 A1    6/2014
JP    2005285440 A    10/2005

OTHER PUBLICATIONS

Fukuda, M. et al., "Lithium-poly-carbonmonofluoride Cylindrical Type Batteries", International Power Sources Symposium Committee, International Power Sources Symposium, 9th, Brighton, Sussex, England, 1974, 18 pgs.
(Continued)

*Primary Examiner* — James M Erwin

(57) ABSTRACT

A Li/CFx primary battery having a lithium-based anode and a fluorinated carbon cathode. The fluorinated carbon cathode includes fluorinated carbon nanoparticles. The structure and size distribution of the carbon precursor carbon nanotubes are configured to provide improved battery performance. The fluorinated carbon nanoparticles can be formed by fluorinating carbon nanoparticles using a fluorine-based reactive gas at a temperature in the range from 300 to 600° C., and the fluorinated carbon nanoparticles can further be used to form the cathode of the primary battery. Producing
(Continued)

the Li/CFx primary batter can also include heating the fluorinated carbon nanoparticles under an inert atmosphere before the fluorinated carbon nanoparticles are used to form the cathode of the primary battery.

20 Claims, 3 Drawing Sheets

(51) Int. Cl.
  H01M 4/38      (2006.01)
  H01M 4/08      (2006.01)
  C01B 32/10     (2017.01)
  H01M 6/14      (2006.01)
  H01M 4/02      (2006.01)

(52) U.S. Cl.
  CPC .......... *H01M 6/14* (2013.01); *C01P 2004/12* (2013.01); *C01P 2004/62* (2013.01); *H01M 2004/021* (2013.01); *H01M 2004/028* (2013.01)

(58) Field of Classification Search
  USPC ...................................................... 429/231.7
  See application file for complete search history.

(56) References Cited

U.S. PATENT DOCUMENTS

| | | | |
|---|---|---|---|
| 4,247,608 A | 1/1981 | Wanatabe et al. | |
| 4,681,823 A | 7/1987 | Tung et al. | |
| 6,841,610 B2 | 1/2005 | Yanagisawa et al. | |
| 7,563,542 B2 | 7/2009 | Yazami et al. | |
| 7,794,880 B2 | 9/2010 | Yazami et al. | |
| 7,939,141 B2 | 5/2011 | Matthews et al. | |
| 8,232,007 B2 | 7/2012 | Yazami et al. | |
| 8,309,024 B2 | 11/2012 | Redko et al. | |
| 2014/0104754 A1* | 4/2014 | Lipka .................... | H01G 11/24 361/502 |
| 2016/0133932 A1 | 5/2016 | Liang et al. | |

OTHER PUBLICATIONS

Hamwi, A. et al., "Fluorination of Carbon Nanotubes", Carbon, 1997, 35(6), pp. 723-728.
Hamwi, A. et al., "Graphite Fluorides Prepared at Room Temperature 1. Synthesis and Characterization", Synthetic Metals, 1988, 26(1), pp. 89-98.
Hamwi, A., "Fluorine Reactivity with Graphite and Fullerenes. Fluoride Derivatives and Some Practical Electrochemical Applications", Journal of Physics and Chemistry of Solids, 1996, 57(6-8), pp. 677-688.
Hany, P. et al., "Low-temperature Carbon Fluoride for High Power Density Lithium Primary Batteries", Journal of Power Sources, 1997, 68, pp. 708-710.
Jayasinghe, R. et al., "Optimization of Multi-Walled Carbon Nanotube Based CFx Electrodes for Improved Primary and Secondary Battery Performances", Journal of Power Sources, 2014, 253, pp. 404-411.
Kita, Y., et al. "Chemical Composition and Crystal Structure of Graphite Fluoride", Journal of the American Chemical Society, 1979, 101(14), pp. 3832-3841.
Lam, P. et al., "Physical Characteristics and Rate Performance of (CFx)n ($0.33<x<0.66$) in Lithium Batteries", Journal of Power Sources, 2006, 153(2), pp. 354-359.
Li, Y. et al., "The Improved Discharge Performance of Li/CFx Batteries by Using Multi-Walled Carbon Nanotubes as Conductive Additive", Journal of Power Sources, 2011, 196(4), pp. 2246-2250.
Liang, H.-P., et al., "Controllable Synthesis of Hollow Hierarchical Palladium Nanostructures with Enhanced Activity for Proton/Hydrogen Sensing", Journal of Physical Chemistry C, 2008, 112(2), pp. 338-344.
Morita, A. et al., "Evaluation of Cathode Materials for the Lithium/Carbonmonofluoride Battery", Journal of Power Sources, 1980, 5(1), pp. 111-125.
Rudorff, W., "Graphite Intercalation Compounds", Advances in Inorganic Chemistry and Radiochemistry, 1959, 1 (C), pp. 223-266.
Tressaud, A. et al., "Fluorinated Carbon Blacks: Influence of the Morphology of the Starting Material on the Fluorination Mechanism", Carbon , 2002, 40(2), pp. 217-220.
Valerga, A. J. et al., "Thermodynamic and Kinetic Data of Carbon-Fluorine Compounds", 1974, TR-ECOM-0056-F, pp. 1-36.
Wang, J. et al., "Understanding and Recent Development of Carbon Coating on LiFePO4 Cathode Materials for Lithium-ion Batteries", Energy & Environmental Science, 2012, 5, pp. 5163-5185.
Wang, Y. et al., "Olivine LiFePO4: Development and Future", Energy & Environmental Science, 2011, 3, pp. 805-817.
Watanabe, N., "Two Types of Graphite Fluorides, (CF)n and (C2F)n, and Discharge Characteristics and Mechanisms of Electrodes of (CF)n and (C2F)n in Lithium Batteries", Solid State Ionics, 1980, 1(1-2), pp. 87-110.
Wittingham, M. S., "Mechanism of Reduction of the Fluorographite Cathode", Electrochemical Science and Technology—Brief Communications, Journal of the Electrochemical Society, 1975, 122(4), pp. 526-527.
Wood, J. L. et al., "The Heat of Formation of Poly (Carbon Monofluoride)", Journal of Physical Chemistry, 1969, 73 (9), pp. 3139-3142.
Yuan, L.-X. et al., "Development and Challenges of LiFePO4 Cathode Material for Lithium-ion Batteries", Energy & Environmental Science, 2011, 12, pp. 269-284.
Zhang, Q. et al., "Carbon-Coated Fluorinated Graphite for High Energy and High Power Densities Primary Lithium Batteries," Journal of Power Sources, 2010, 195(9), pp. 2914-2917.
Zhang, S. S. et al., "Enhancement of Discharge Performance of Li/CFx Cell by Thermal Treatment of CFx Cathode Material", Journal of Power Sources, 2009, 188(2), pp. 601-605.
Office Action issued in U.S. Appl. No. 14/935,043 dated Jun. 28, 2018, 6 pages.
Combined Search and Examination Report of GB Patent Application No. 1419745.3 dated Jul. 10, 2015, 9 pages.
Examination Report of GB Patent Application No. 1419745.3 dated Apr. 5, 2017, 2 pages.

\* cited by examiner

METHODS OF PRODUCING A LITHIUM CARBON FLUORIDE PRIMARY BATTERY

CROSS-REFERENCE TO RELATED APPLICATIONS

This application is a divisional of U.S. patent application Ser. No. 14/935,043, filed Nov. 6, 2015, which claims priority to U.K. Patent Application No. 1419745.3, filed Nov. 6, 2014. Each of the foregoing is expressly incorporated herein by this reference in its entirety.

BACKGROUND

The present invention relates to a lithium carbon fluoride ("Li/CFx") primary battery comprising a lithium-based anode and a fluorinated carbon cathode.

Fluorinated carbon/graphite is known by the chemical formula $(CFx)_n$, where x is a number between 0 and 1.3 and n is an indefinite number greater than 2. $(CFx)_n$ is normally abbreviated as CFx. CFx has attracted considerable interest due to its commercial application as a cathode material in primary lithium batteries, as well as other applications, such as lubrication additives, dry ink additives, elastomeric seal additives etc.

CFx is usually obtained by directly fluorinating graphite, or a form of carbon having some graphitic structural characteristics, with elemental fluorine gas at elevated temperatures. Pioneering studies were reported by Ruff and Bretschneider (1), who prepared a grey compound having a composition of CFx (x=0.92). Rüdorff et al. (2, 3) published a series of studies on graphite fluoride between 1947 and 1959. CFx, where x is between 0.676 and 0.988, was obtained by careful control of the reaction between graphite and gaseous fluorine under certain temperature ranges. With increasing fluorine content the colour of the CFx changes from dark grey to cream white. In addition, CFx exhibits a wide range of electrical resistivity and a low surface free energy with varying x value. Normally, the higher the x value, the higher the electrical resistivity of the CFx. Other low temperature fluorination methodologies with fluorine containing gas, such as volatile fluoride $BF_3$, $ClF_3$, $IF_5$, $NF_3$ etc. in anhydrous hydrogen fluoride have been reported (4, 5).

Li/CFx batteries show many advantages over other types of lithium batteries, such as long shelf lives, wide operational temperature ranges, improved safe operation and high energy densities (6, 7). Consequently, one of the main applications of CFx is in primary batteries. In a Li/CFx primary battery, the overall discharge reaction was first postulated by Wittingham (8) and can be schematized by equation (1):

$$CFx + xLi \leftrightarrow C + xLiF \quad (1)$$

The theoretical specific discharge capacity $Q_{th}$, expressed in milliampere-hour per gram (mAh·g$^{-1}$), is given by equation (2):

$$Q_{th}(x) = \frac{xF}{3.6(12 + 19x)} \quad (2)$$

where F is the Faraday constant (96485 Coulomb/mol) and 3.6 is a unit conversion constant. Thus the specific discharge capacity of a Li/CFx cell is dependent on the value of x, with the capacity increasing with the value of x. When x is equal to 1.00, the theoretical capacity of CFx in a Li/CFx battery is 865 mAh·g$^{-1}$, which is higher than that of $SOCl_2$ used in Li/$SOCl_2$ primary batteries.

Watanabe et al. (9, 10) described a primary battery which includes active CFx as a cathode material. In addition, Watanabe et al. (11, 12) described a poly-dicarbon monofluoride represented by the formula $(C_2F)_n$ as an active cathode material for an electrolytic cell of high voltage. A discharge voltage of 2.4 volts vs. Li was obtained from $(C_2F)_n$, which is 0.4 volts higher than that of $(CF)_n$ material. More recently, Yazami et al (13) disclosed a subfluorinated graphite fluoride of formula CFx, in which x was in the range of 0.06 to 0.63, as cathode material. In addition, Yazami et al (14) further described a subfluorinated CFx, in which 0.63≤x≤0.95, the CFx comprising strong and weak carbon fluorine bonds.

Systematic studies have reported that the x value of CFx largely depends on the fluorination temperature, the partial pressure of the fluorine in the fluorinating gas, and the physical characteristics of the carbon/graphite precursor used in the fluorination reaction (15, 16). For example, Watanabe (15) reported experimental results with regards to the influences of reaction temperature, fluorine pressure, particle size of graphite, and graphitization degree of carbon on the composition and crystal structure of graphite fluoride. Tressaud et al (16) investigated the influence of the morphology of the starting carbon precursor on the fluorination mechanism with X-ray photoelectron spectroscopy.

In light of the importance of x value of CFx in the application of primary batteries, various techniques such as X-ray diffraction, X-ray photoelectron spectroscopy, solid state nuclear magnetic resonance and infrared spectroscopy have been reported to characterize CFx (14, 15). In addition, Redko et al (17) described a system for non-destructive determination of the degree of fluorination in carbon monofluoride (CFx) during the synthesis process.

The thermal decomposition temperature of CFx is very close to the temperature used for the formation of CFx, during the fluorination process.

Carbon has many different forms, such as graphite, carbon black, petroleum coke, carbon nanotubes, carbon fibers, graphene etc., and the fluorination process varies when different carbon precursors are used. Generally, the formation of CFx differs owing either to the degree of graphitization or to the type of the carbon material (18). Normally, the higher the degree of graphitization, the higher the reaction temperature needed. For instance, Watanabe et al. (9, 10) reported that direct fluorination of amorphous carbon can be conducted at a relatively low temperature compared to more graphitized carbon.

Graphitized petroleum coke is a common precursor for the fluorination of CFx. Other amorphous carbons, such as, acetylene black, charcoal and vegetable active carbon, have also been reported (10). Recently, there have been reports on the use of carbon fibres and nanotubes as precursors in the high temperature fluorination process. For instance, fluorination of multi-walled carbon nanotubes under pure fluorine atmosphere was reported by Hamwil et al (19). Yanagisawa et al (20) described the use of fluorinated carbon fibres as an active battery material and as a lubricant. Yazami et al (21) disclosed the fluorination of multi-layered carbon nanofibres. Recently, Sumanasekera et al (22) reported that fully fluorinated multi-walled carbon nanotubes exhibited capacities exceeding 815 mAh·g$^{-1}$ whereas partially fluorinated samples exhibited systematically lower capacities with decreasing x.

Matthews et al (23) disclosed the production of fluorinated carbon nanostructures with a formula CFx in a plasma chamber supplied with a fluorocarbon or a fluorocarbon containing mixture. However the resulting x value, where $0.06 \leq x \leq 0.15$, by this method was relatively low.

Although Li/CFx batteries have many advantages over other types of lithium batteries, in practical Li/CFx cells, several issues, such as low practical energy and capacity, low operating voltage during discharge, voltage delay at the beginning of discharge, and heat generation during the discharge process, have been reported. For example, the theoretical voltage of CFx (x=1) is 4.57 V given by Wood et al (24, 25), but the practical discharge voltage of a Li/CFx cell (about 2.5 v) is lower than the open circuit potential of 3.2-3.5V and much lower than the theoretical voltage.

The capacity or performance of a lithium/CFx cell largely depends on the properties of the CFx obtained from the fluorination process, and the aforementioned problems are likely caused by the poor intrinsic electrical conductivity of CFx. CFx exhibits a wide range of electrical resistivities depending upon the fluorine content. High x values can produce electrical resistivities as large as $10^{11}\Omega$. In addition, the formation of ionic and electronic insulating lithium fluoride during the discharge process can also affect the performance of a cell.

To try to solve such problems, Tung et al (26) disclosed a method of using a thick carbon bed and type of underfluorinated CFx for the production of improved CFx as a cathode active material in a Li/CFx cell, which inhibits the initial voltage delay upon discharge. In addition, Yazami et al (13, 27) synthesized subfluorinated carbon materials (CFx, $0.33<x<0.66$), which exhibited improved performance at high discharge rates in a Li/CFx cell. Nevertheless, this approach results in a decrease in the specific discharge capacity as the x value is reduced.

Other approaches, such as thermal treatment of CFx (28), carbon coated CFx (29) and use of multi-walled carbon nanotubes as a conductive additive in the cathode material (30), have been reported to improve discharge performance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth.

Embodiments of the present disclosure provide for Li/CFx primary batteries with improved the properties. Although large amounts of effort have been made towards improving the performance of CFx during the discharge process in Li/CFx batteries, surprisingly little is known about how the structure and size distribution of the carbon precursor affects the performance of the cathode material, and in fact structure and size distribution of the carbon precursor has previously been ignored or regarded as irrelevant, while other factors have been used to determine/predict/design performance of the cathode material. Moreover, small structure and/or size distributions, such as nanoparticles or the like, of the carbon precursor have often been avoided due to fluorination problems. The present invention proposes the use of fluorinated carbon nanoparticles to form the cathode of a Li/CFx primary battery.

Accordingly, a first aspect of an embodiment of the present disclosure provides a Li/CFx primary battery having a lithium-based anode and a fluorinated carbon cathode, wherein the fluorinated carbon cathode includes fluorinated carbon nanoparticles.

A second aspect of an embodiment of the present disclosure provides a method of producing a Li/CFx primary battery according to the first aspect, where the method comprises forming fluorinated carbon nanoparticles by fluorinating carbon nanoparticles using a fluorine-based reactive gas (such as fluorine) at a temperature in the range from 300 to 600° C.; and using the fluorinated carbon nanoparticles to form the cathode of the primary battery.

The method may further include heating the fluorinated carbon nanoparticles under an inert atmosphere before the fluorinated carbon nanoparticles are used to form the cathode of the primary battery. For example, the heating may be at a temperature in the range from 100 to 400° C.

Further embodiments of the present disclosure will now be set out. These embodiments are applicable singly or in any combination with any of the aspects described herein.

The fluorinated carbon cathode may substantially entirely consist of fluorinated carbon nanoparticles.

The fluorinated carbon nanoparticles may have a number-weighted diameter distribution, as measured by scanning electron microscopy, transmission electron microscopy and/or atomic force microscopy, in which the D10 particle diameter is at least about 10 nm, and preferably at least about 30 nm. The fluorinated carbon nanoparticles may have a number-weighted diameter distribution, as measured by scanning electron microscopy, transmission electron microscopy and/or atomic force microscopy, in which the D90 particle diameter is at most about 300 nm, and preferably at most about 200, 100 or 70 nm. The number-weighted diameter distribution may be obtained by: examining a microscope image of the nanoparticles and identifying at least about 50, and preferably at least about 100, discrete nanoparticles in the image, measuring the imaged diameters of the identified nanoparticles, and converting the imaged diameters to nanoparticles diameters using the scale of the image.

The particle diameters of substantially all of the fluorinated carbon nanoparticles may be in the range from about 1 to 500 nm, and preferably in the range from 1 to 100 nm.

The fluorinated carbon nanoparticles may be substantially equiaxed. Thus the aspect ratios of substantially all of the fluorinated carbon nanoparticles may be less than about 2, and preferably less than about 1.5.

The value of x may be at least about 0.3. The value of x may be at most about 1.2.

The specific surface area of the fluorinated carbon nanoparticles may be at least about 10 m$^2$/g, and preferably at least about 100, 200 or 500 m$^2$/g. The specific surface area of the fluorinated carbon nanoparticles may be at most about 2000 m$^2$/g. The specific surface area can be determined from the Brunauer-Emmett-Teller (BET) adsorption isotherm equation. For example, using e.g. an Autosorb-1™ system from Quantachrome UK Ltd., nitrogen adsorption-desorption isotherms can be obtained from about 0.1-0.2 g samples of the fluorinated carbon nanoparticles, which are degassed for 2 hours at 120° C. prior to the adsorption measurements being taken. Preferably at least five measurement points at relative pressures of 0.1-0.30 are taken for each isotherm.

The lithium-based anode may be formed of lithium metal, or a lithium alloy such as LiMg or LiBMg.

The battery may have an electrolyte which is an organic solvent, such as ethylene carbonate, dimethyl carbonate, diethyl carbonate or a mixture of any two or more such organic solvents, containing dissolved lithium salt. For high temperature applications, the electrolyte can be a molten salt, such as a molten salt containing lithium ions. For example, the molten salt can be LiCl or a composition containing LiCl, such as a eutectic composition with KCl and/or NaCl.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide a thorough understanding of the embodiments. However, it will be understood by one of ordinary skill in the art that embodiments maybe practiced without these specific details.

In an embodiment of the present disclosure, use of carbon nanoparticles as a substrate for fluorination and their subsequent use in high temperature batteries is provided. As discussed above, in some embodiments, the performance of the CFx material may depend on the fluorination process and the interplay between the carbon and fluorine ratio. Too much fluorine brings about poor conductivity of the cathode and too little fluorine results in insufficient Li ion uptake to operate as a cathode, and therefore a low capacity. Furthermore, the discharge process in Li/CFx batteries is associated with Li ion intercalation as well as breaking of C—F bonds. The Li ion conductivity and activation energy of breaking C—F bonds is closely related to the structure and particles size of CFx.

Advantages that nanoparticle structures have over conventional cathode materials are their high packing densities, large exposed surface areas and low activation energies for C—F bonds. The large surface areas allow a higher degree of fluorination sites to be achieved per unit weight of carbon material, with higher fluorination allowing higher capacities to be achieved. In addition, due to higher packing densities, the x value in CFx can be reduced, allowing greater conductivity in the cathode material compared to conventional cathode materials. Low activation energies for C—F bonds from the CFx nanoparticles may facilitate the discharge process, allowing higher capacity to be obtained.

Below are described analyses of suitable CFx carbon nanoparticles.

Figure 1:
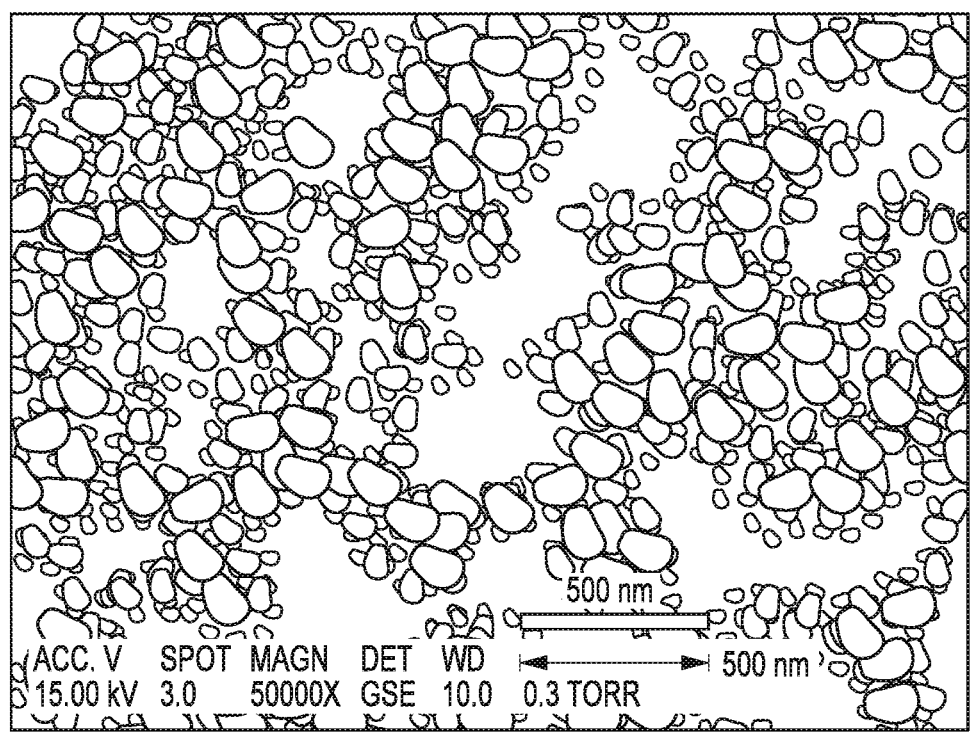
FIG. 1 shows a typical scanning electron microscopy (SEM) image of a CFx cathode material for use in a Li/CFx primary battery.

FIG. 1 shows a typical scanning electron microscopy (SEM) image of a CFx cathode material for use in a Li/CFx primary battery. The SEM was carried out using an FEI XL30 FEG environmental scanning electron microscope to characterize the particle size and structure. From the image, the particle diameter of the CFx material is in the range from 10 to 200 nm.

Figure 2:
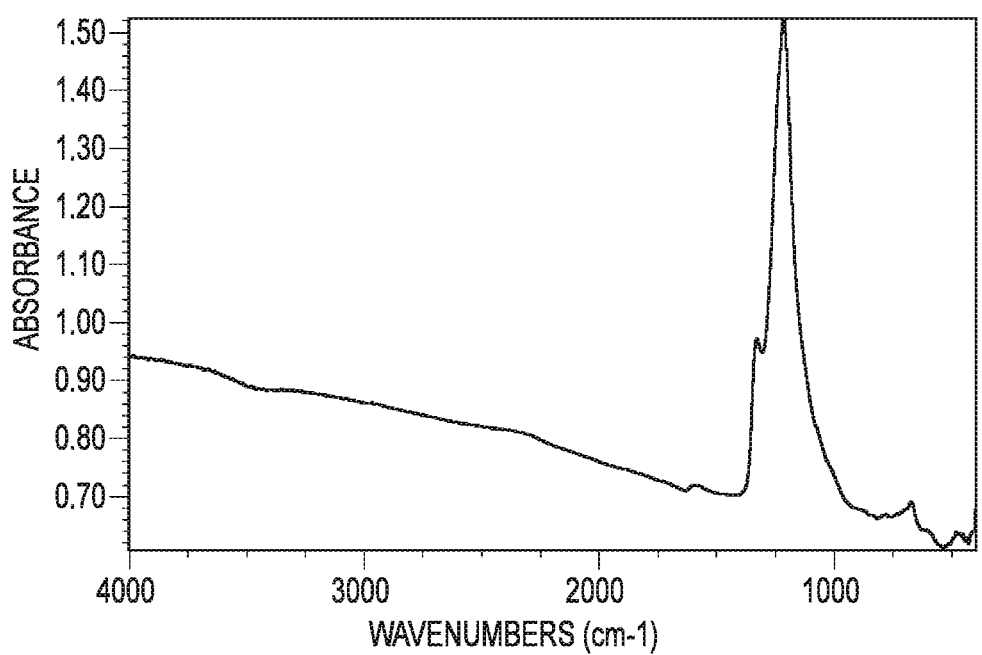
FIG. 2 shows a typical diffuse reflectance infrared Fourier transform (DRIFT) spectrum of the CFx cathode material.

FIG. 2 shows a typical diffuse reflectance infrared Fourier transform (DRIFT) spectrum of the CFx cathode material recorded on an infrared spectrometer (NICOLET 6700, Thermo Scientific) using a Spectra-Tech Collector diffuse reflectance accessory. The principal band at 1212 cm$^{-1}$ and the weaker band at 1325 cm$^{-1}$ are due to the carbon-fluorine stretching frequency of CFx.

Figure 3:
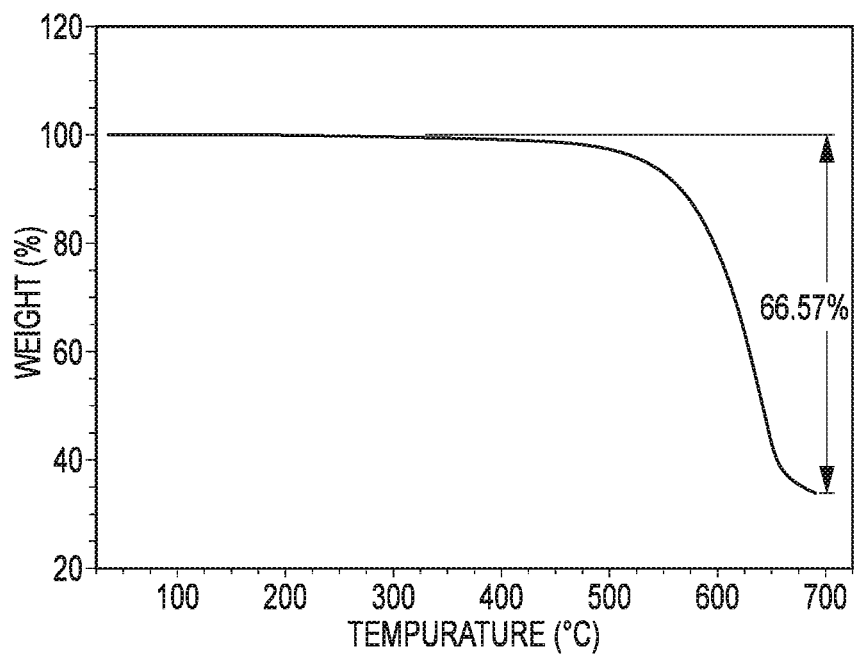
FIG. 3 shows a thermal gravimetric analysis (TGA) profile of the CFx cathode material.

FIG. 3 shows a thermal gravimetric analysis (TGA) profile of the CFx cathode material, carried out on a thermal gravimetric analyzer (TA instrument, Q5000IR) under helium gas atmospheres. Helium purge gas (BIP, Air products) was introduced at a flow rate of 10 mL/min in all experiments. From the profile, the weight loss is 67% when the material is heated to 690° C. at a ramp rate of 20° C./min.

Figure 4:
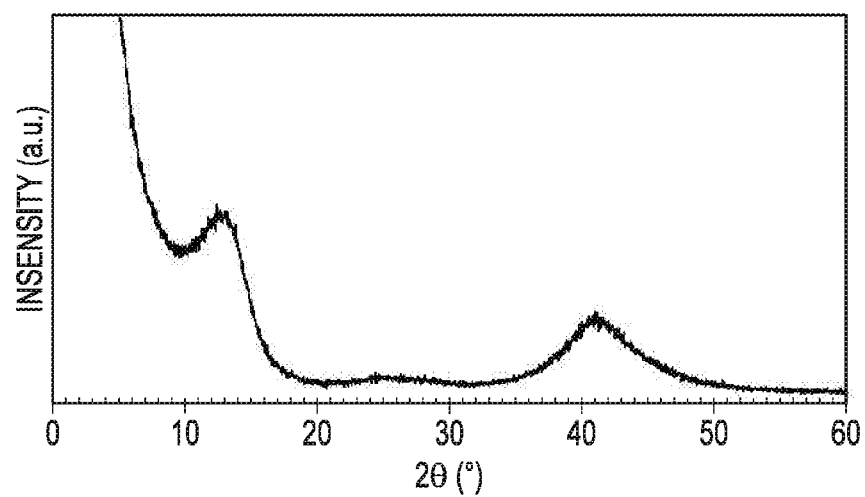
FIG. 4 shows a typical X-Ray diffraction pattern of CFx nanoparticles.

FIG. 4 shows a typical X-Ray diffraction pattern of the CFx nanoparticles collected on a Bruker D8-Advance X-ray diffractometer with Cu Ka radiation (0.1542 nm) at an operating voltage of 40 kV4. The pattern shows two diffraction peaks at 2θ of around 13° and approximately 41°. According to reported results (15) which use graphite as the CFx precursor, these peaks can be indexed to the diffraction of {001} and {100} planes. The broadening of the peaks probably results from the small size of the nanoparticles.

Figure 5A:
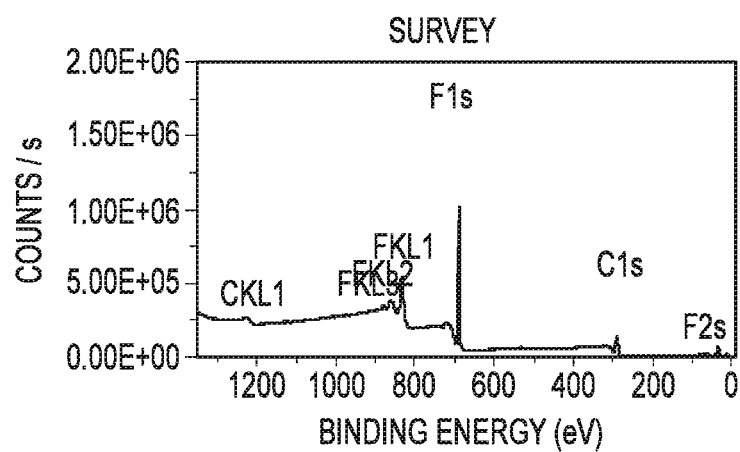
FIG. 5A shows a typical X-ray photoelectron spectroscopy (XPS) spectra of survey obtained from the surface of the CFx cathode material.
Figure 5B:
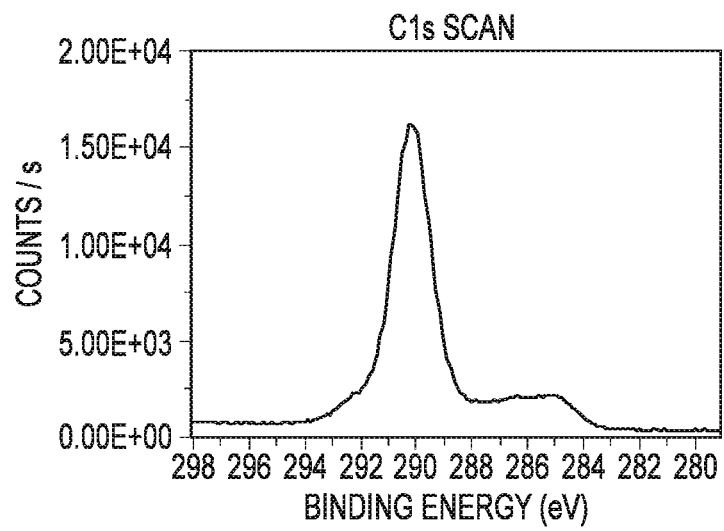
FIG. 5B illustrates a corresponding C1s XPS scan with respect to FIG. 5A.
Figure 5C:
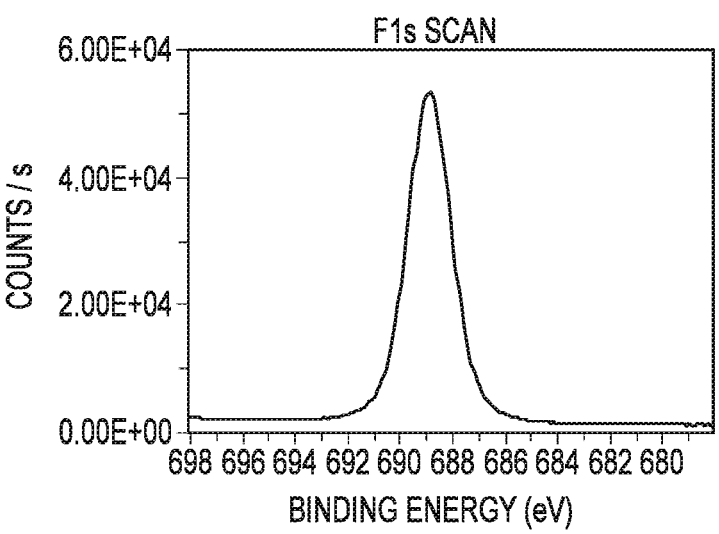
FIG. 5C illustrates the corresponding F1s XPS scan with respect to FIGS. 5A and 5B.

FIG. 5A shows a typical X-ray photoelectron spectroscopy (XPS) spectra of survey obtained from the surface of the CFx cathode material. FIGS. 5B and 5C show the corresponding C1s XPS scan and F1 s XPS scan, respectively. The XPS was performed on a K-Alpha X-ray photoelectron spectrometer (Thermo Scientific) with an Al Kα micro focused monochromated X-ray source. The XPS spectra confirm that the CFx materials are mainly composed of the elements carbon and fluorine.

Cathodes can be prepared from a mixture of the CFx carbon nanoparticles, carbon additive(s) and a binder, such as polyvinylidene difluoride (PVDF), polytetrafluoroethylene (PTFE), polyethylene glycol (PEO) and/or poly(acrylonitrile) (PAN), in a suitable solvent. The resultant dough can be pressed using jewellers rolls, or similar, to form a sheet. The sheet can then be vacuum dried and electrodes cut to size from the sheet. Test cells can be made incorporating the CFx cathode, a lithium-based anode and an organic solvent based electrolyte containing dissolved lithium salt. A separator (e.g. formed from polyethylene, polypropylene, glass fibre, PTFE, polyimide and/or cellulose) can be used to separate the cathode and anode to prevent a short circuit.

In one embodiment, fluorinated carbon nanoparticles may be produced by fluorinating carbon nanoparticles using a fluorine-based reactive gas (such as fluorine) at a temperature in the range from 300 to 600° C. The fluorinated carbon nanoparticles may then be used, in accordance with an embodiment of the present disclosure to form a cathode of a primary battery. In one embodiment, the fluorinated carbon cathode may substantially entirely consist of fluorinated carbon nanoparticles.

In some embodiments, the fluorinated carbon nanoparticles may be heated under an inert atmosphere before the fluorinated carbon nanoparticles are used to form the cathode of the primary battery. For example, the heating may be at a temperature in the range from 100 to 400° C.

In some embodiments of the present disclosure, the fluorinated carbon nanoparticles may have a number-weighted diameter distribution, in which the D10 particle diameter is at least about 10 nm, and preferably at least about 30 nm. The fluorinated carbon nanoparticles may have a number-weighted diameter distribution, as measured by scanning electron microscopy, transmission electron microscopy and/or atomic force microscopy, in which the D90 particle diameter is at most about 300 nm, and preferably at most about 200, 100 or 70 nm. The number-weighted diameter distribution may be obtained by: examining a microscope image of the nanoparticles and identifying at least about 50, and preferably at least about 100, discrete nanoparticles in the image, measuring the imaged diameters of the identified nanoparticles, and converting the imaged diameters to nanoparticles diameters using the scale of the image.

In some embodiments, he particle diameters of substantially all of the fluorinated carbon nanoparticles may be in the range from about 1 to 500 nm, and preferably in the range from 1 to 100 nm. In some embodiments, the fluorinated carbon nanoparticles may be substantially equiaxed. Thus, the aspect ratios of substantially all of the fluorinated carbon nanoparticles may be less than about 2, and preferably less than about 1.5.

In some embodiments, the value of x may be at least about 0.3. The value of x may be at most about 1.2.

In some embodiments, the specific surface area of the fluorinated carbon nanoparticles may be at least about 10 m$^2$/g, and preferably at least about 100, 200 or 500 m$^2$/g. The specific surface area of the fluorinated carbon nanoparticles may be at most about 2000 m$^2$/g.

The lithium-based anode may be formed of lithium metal, or a lithium alloy such as LiMg or LiBMg.

The battery may have an electrolyte which is an organic solvent, such as ethylene carbonate, dimethyl carbonate, diethyl carbonate or a mixture of any two or more such organic solvents, containing dissolved lithium salt. For high temperature applications, the electrolyte can be a molten salt, such as molten salt containing lithium ions. For example, the molten salt can be LiCl or a composition containing LiCl, such as a eutectic composition with KCl and/or NaCl.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

REFERENCES

All references referred to herein are incorporated by reference.
1. Ruff, O., Bretschneider, O. Z. Anorg. Allg. Chem., 217, 1 (1937).
2. Rudorff, W., Riidorff, G. Z. Anorg. Allg. Chem., 253, 281 (1947).
3. Rudorff, W. Adv. Inorg. Chem. Radiochem., 1, 230 (1959).
4. Hamwi, A. Daoud, M. Coussems, J. C. Synth. Met., 89, 26 (1988).
5. Hany, P., Yazami, R., Hamwi, A. J. of Power Sources 708, 68 (1997).
6. Fukuda, M., Iijima, T. International Power Sources Symposium Committee, International Power Sources Symposium, 9th, Brighton, Sussex, England, Sep. 17-19, (1974), Paper, 16p.
7. Morita, A., Iijima, T., Fujii, T., Ogawa, H. J. of Power Sources 111, 5 (1980).
8. Wittingham, M. S. J. Electrochem. Soc. 526, 122 (1975).
9. Watanabe, N., Fukuda, M., U.S. Pat. No. 3,536,532, Apr. 7, 1969.
10. Watanabe, N., Fukuda, M., U.S. Pat. No. 3,700,502, Oct. 24, 1972.
11. Watanabe, N., Morigaki, K., U.S. Pat. No. 4,247,608, Jan. 27, 1981.
12. Watanabe, N., Solid State Ionics. 87, 1 (1980).
13. Yazami, R., Hamwi, A., U.S. Pat. No. 7,563,542, Jul. 21, 2009.
14. Yazami, R., Hamwi, A., U.S. Pat. No. 8,232,007, Jul. 31, 2012.
15. Watanabe, N., J. Am. Chem. Soc. 3832, 101 (1979).
16. Tressaud, A., Shirasaki, T., Nansé, G., Papirer, E. Carbon 217, 40 (2002).
17. Redko, V., Shembel, E. M., Khandetskyy, V. S., Meshri, D. T., Angres, I. A., Adams, R., Sivtsov, D., Pastushkin, T. V., U.S. Pat. No. 8,309,024, Nov. 13, 2012.
18. Hamwi, A. et al. J. Phys. Chem. Solids, 677, 57 (1996).
19. Hamwi, A. Alvergnat, H., Bonnamy, S., Béguin, F. Carbon 723, 35 (1997).
20. Yanagisawa, T., Endo, M., U.S. Pat. No. 6,841,610, Jan. 11, 2005.
21. Yazami, R., Hamwi, A., U.S. Pat. No. 7,794,880, Sep. 14, 2010.
22. Jayasinghe, R., Thapa, A. K., Dharmasena, R. R., Nguyen, T. Q., Pradhan, B. K., Paudel, H. S., Jasinski, J. B., Sherehiy, A., Yoshio, M., Sumanasekera, G. U. J. of Power Sources 404, 253 (2014).
23. Matthews, E. S., Duan, X., Powell, R. L., U.S. Pat. No. 7,939,141, May 10, 2011.
24. Wood, J. L.; Valerga, A. J.; Badachhape, R. B.; Parks, G. D.; Kamarchik, P.; Margrave, J. L. Thermodynamic and Kinetic Data of Carbon-Fluorine Compounds; TR-ECOM-0056-F; (1974).
25. Wood, J. L.; Badachhape, R. B.; Lagow, R. J.; Margrave, J. L. Heat of Formation of Poly (Carbon Monofluoride). J. of Phys. Chem. 3139, 73 (1969).
26. Tung, H. S., Friedland, D. J., Sukornick, B., McCurry, L. E., Eibeck, R. E., Lockyer, G. D. U.S. Pat. No. 4,681,823, Jul. 21, 1987.

27. Lam, P., Yazami, R., J. of Power Sources 354, 153 (2006).
28. Zhang, S. S., Foster, D., Read, J., J. of Power Sources 601, 188 (2009).
29. Zhang, Q., D'Astorg, S., Xiao, P., Zhang, X., Lu, L. J. of Power Sources 2914, 195 (2010).
30. Li, Y., Chen, Y., Feng, W., Ding, F., Liu, X. J. of Power Sources 2246, 196 (2011).

What is claimed is:

1. A method of producing a Li/CFx primary battery, the method including:
    forming fluorinated carbon nanoparticles by fluorinating carbon nanoparticles using a fluorine-based reactive gas at a temperature in the range from 300 to 600 ° C.;
    using the fluorinated carbon nanoparticles to form a cathode of the primary battery; and
    incorporating the cathode that includes fluorinated carbon nanoparticles with a lithium-based anode.

2. A method of producing a Li/CFx primary battery according to claim 1, wherein forming the fluorinated carbon nanoparticles comprises forming fluorinated carbon nanoparticles having a number-weighted diameter distribution in which a D10 particle diameter is at least 10 nm.

3. A method of producing a Li/CFx primary battery according to claim 2, further comprising:
    measuring the number-weighted diameter distribution by one or more of scanning electron microscopy, transmission electron microscopy, or atomic force microscopy.

4. A method of producing a Li/CFx primary battery according to claim 1, wherein forming the fluorinated carbon nanoparticles comprises forming fluorinated carbon nanoparticles having a number-weighted diameter distribution, as measured by scanning electron microscopy, transmission electron microscopy, or atomic force microscopy, in which a D90 particle diameter is at most 300 nm.

5. A method of producing a Li/CFx primary battery according to claim 1, wherein forming the fluorinated carbon nanoparticles comprises forming fluorinated carbon nanoparticles wherein diameters of substantially all of the fluorinated carbon nanoparticles are in a range from 1 to 500 nm.

6. A method of producing a Li/CFx primary battery according to claim 1, wherein a value of x is at least 0.3.

7. A method of producing a Li/CFx primary battery according to claim 1, wherein a value of x is at most 1.2.

8. A method of producing a Li/CFx primary battery according to claim 1, wherein forming the fluorinated carbon nanoparticles comprises forming fluorinated carbon nanoparticles with a specific surface area of at least 10 m$^2$/g.

9. A method of producing a Li/CFx primary battery according to claim 1, wherein forming the fluorinated carbon nanoparticles comprises forming equiaxed fluorinated carbon nanoparticles.

10. A method of producing a Li/CFx primary battery according to claim 1, wherein forming the fluorinated carbon nanoparticles comprises forming fluorinated carbon nanoparticles having aspect ratios less than 2.

11. A method of producing a Li/CFx primary battery according to claim 1, wherein the method further includes:
    heating the fluorinated carbon nanoparticles under an inert atmosphere before the fluorinated carbon nanoparticles are used to form the cathode of the primary battery.

12. A method of producing a Li/CFx primary battery according to claim 11, wherein heating the fluorinated carbon nanoparticles includes heating at a temperature between 100 and 400 ° C.

13. A method of producing a Li/CFx primary battery according to claim 1, further comprising:
    separating the cathode and the anode with a separator.

14. A method of producing a Li/CFx primary battery according to claim 13, the separator including one or more of polyethylene, polypropylene, glass fibre, polytetrafluoroethylene, polyimide, or cellulose.

15. A method of producing a Li/CFx primary battery according to claim 8, the specific surface area of at least some of the fluorinated carbon nanoparticles being at least 100 m$^2$/g.

16. A method of producing a Li/CFx primary battery according to claim 8, the specific surface area of at least some of the fluorinated carbon nanoparticles being at least 200 m$^2$/g.

17. A method of producing a Li/CFx primary battery according to claim 8, the specific surface area of at least some of the fluorinated carbon nanoparticles being at least 500 m$^2$/g.

18. A method of producing a Li/CFx primary battery according to claim 8, the specific surface area of the fluorinated carbon nanoparticles being at most 2000 m$^2$/g.

19. A method of producing a Li/CFx primary battery according to claim 1, the lithium-based anode including one or more of boron or magnesium.

20. A method of producing a Li/CFx primary battery according to claim 1, further comprising:
    incorporating an electrolyte including one or more of ethylene carbonate, dimethyl carbonate, diethyl carbonate, dissolved lithium salt, or a molten salt containing lithium and a eutectic composition with at least one of KCl or NaCl.

* * * * *